3,183,204
PROCESS FOR THE PRODUCTION OF RUBBER-LIKE POLYMERS

Frederico Engel, Paul Kranzlein, and Johannes Schafer, all of Marl, Kreis Recklinghausen, Germany, assignors to Chemische Werke Huls Aktiengesellschaft, Marl, Kreis Recklinghausen, Germany, a corporation of Germany
No Drawing. Filed Dec. 20, 1960, Ser. No. 77,007
Claims priority, application Germany, Apr. 5, 1960, C 21,140
1 Claim. (Cl. 260—33.6)

It is known that monomers such as diolefines and even monoolefines as well as mixtures thereof can be polymerized in an organic solvent or suspending medium to rubber like products by the use of mixed catalysts formed from compounds of metals of Subgroups IV to VI and Group VIII of the Periodic System of Mendeleeff and metallo-organic compounds of metals of Groups I to III of the Periodic System of Mendeleeff. Heretofore aliphatic and cycloaliphatic hydrocarbons as well as chlorinated hydrocarbons and aromatic hydrocarbons have been used as solvent and suspending media. It is also known to carry out the block polymerization of butadiene alone or mixed with other polymerizable compounds, such as styrene, in the presence of alkali metals in a worm extruder.

It has now been found that rubber-like polymers can be made advantageously by the polymerization of diolefines and even also monoolefines as well as mixtures thereof in the presence of mixed catalysts of compounds of metals of Subgroups IV to VI and Group VIII of the Periodic System of Mendeleeff and metallo-organic compounds of metals of Groups I to III of the Periodic System of Mendeleeff if the catalyst is dissolved or suspended in an extender oil which remains in the polymer and if the polymerization is carried out in a worm extruder. The process is especially adapted for the production of high cis-containing 1,4 polydiolefines from monomer diolefines such as butadiene and isoprene and further for the production of homo- and mixed polymers from monoolefines such as ethylene, propylene and butylene and also mixed polymers of mono- and diolefines.

A mixture of mono- and dialkylbenzenes having higher alkyl groups, available under the trade name "Product SN" and being the distillation residue of the alkylation of benzene and also the aliphatic extender oil available under the trade name Dutrex SPX 334 are examples of suitable extender oils for use in the invention. The extender oil must exert little or no effect upon the catalyst. The amount of extender oil used may be within the range from 1 to 60 parts, and preferably between 5 and 50 parts by weight per 100 parts by weight of rubber.

Suitable catalysts for use in the process are, for example, the hologenides of titanium such as titanium tetrabromide and titanium tetraiodide in combination with metallo-organic compounds of Groups I to III of the Periodic System of Mendeleeff such as aluminum trialkyls and also anhydrous or nearly anhydrous cobalt salts, cobalt salts which have been rendered soluble by polar organic compounds as well as soluble cobalt salts of organic acids in combination with alkyl hologenides of metals of Groups II and III of the Periodic System of Mendeleeff such as aluminum dialkylmonohalogenide, aluminum alkylsesquihalogenide and aluminium monoalkyl dihalogenide.

Due to the good miscibility especially in a multiple worm extruder the monomer and the extender oil are very quickly mixed. The reaction heat is distributed along the length of the tube of the extruder and is carried off by separate, controllable cooling zones which if necessary may be equipped also for heating. The polymerization is carried out at temperatures of from −30° C. to +70° C. and preferably within the range from −30° to +50° C.

Shortly before the discharge end of the extruder tube polymerization interruptors such as alcohols and stabilizers such as customarily are used in rubber manufacture such as phenyl-beta-naphthylamine, the condensation product of acetone and diphenylamine and styrolized para-cresol may be homogeneously mixed into the polymerizate so that at the end of the tube an extender-containing product in condition for processing is continuously discharged. If necessary traces of unreacted starting material and materials resulting from the decomposition of the catalyst may be exhausted at the end of the tube or in a supplemental apparatus.

The invention is illustrated by the following specific examples.

Example 1

A mixture of 1000 parts by weight of butadiene and 330 parts by weight of the extender oil "Product SN" referred to above in which 12 parts by weight of aluminum ethylsesquichloride are dissolved and 330 parts by weight of the "Product SN" in which 0.04 part by weight of cobalt dichloride and 70 mols of butanol per mol of the cobalt dichloride are dissolved is introduced per hour into a worm extruder having several worms within a tube equipped for heating and cooling. 1650 parts by weight of oil-extended polybutadiene are produced whose double bonds contain more than 95% of the 1,4-cis configuration.

Example 2

A mixture of 1000 parts by weight of butadiene, 235 parts by weight of "Dutrex SPX334" in which 70 parts by weight of titanium tetrabromide are dissolved and 235 parts by weight of "Dutrex SPX334" in which 22.5 parts by weight of aluminum triethyl are dissolved is introduced per hour under the conditions described in Example 1. The double bonds of the resulting gel-free product have 86% of the 1,4-cis configuration.

In the foregoing description the trade names "Product SN" and "Dutrex SPX 334" refer to distillation fractions produced by the petrochemical industry which are commonly used in the rubber industry. They are mixtures of hydrocarbons having the following characteristics:

|  | Dutrex SPX 334 | Product SN |
|---|---|---|
| Viscosity | 4.72 cst./ 98.9° C. | 4.42 cst. |
| Density | 0.8792 | 0.8789. |
| Viscosity-density constant | 0.814 | 0.805. |
| Flash point | 230° C | 175° C. |
| Solidifying point | −70° C | −37° C. |
| Molecular weight | 440 | 333–337. |
| Content of basic nitrogen compounds calculated as $N_2$ | 0% | 0.1%. |
| Sulfur content | 0.08% | 11 mg./kg. |
| $n_D^{20°}$ C | 1.4822 | 1.4938. |

We claim:

Process for producing a mixture of 100 parts by weight of an elastomeric polymer and 1 to 60 parts by weight of an extender oil which comprises polymerizing an olefine selected from the group consisting of monoolefines, diolefines and mixtures thereof in the presence of a catalyst formed by reacting a compound selected from the group consisting of compounds of metals of Subgroups IV to VI and Group VIII of the Periodic System of Mendeleeff with a compound selected from the group consisting of metallo-alkyl compounds of metals of Groups I to III of the Periodic System of Mendeleeff, said catalyst being dispersed in an extender oil selected from the group consisting of aliphatic hydrocarbons and mono- and dialkylbenzenes having higher alkyl groups which remains in the polymer, the polymerization being carried out under the action of a worm extruder.

References Cited by the Examiner

UNITED STATES PATENTS

| | | | |
|---|---|---|---|
| 2,894,824 | 7/59 | Lanning | 260—95 |
| 2,924,591 | 2/60 | Roelen | 260—95 |
| 2,962,491 | 11/60 | Mertzweiller | 260—94.9 |
| 3,035,040 | 5/62 | Findlay | 260—95 |
| 3,065,220 | 11/62 | McManimie et al. | 260—95 |

ALEXANDER H. BRODMERKEL, *Primary Examiner.*

DANIEL ARNOLD, MORRIS LIEBMAN, *Examiners.*